US008356319B2

(12) United States Patent
Fernandez et al.

(10) Patent No.: US 8,356,319 B2

(45) Date of Patent: Jan. 15, 2013

(54) SCREEN SAVER TRIGGER USING PARTIAL STILL PICTURE DETECTION

(75) Inventors: Gustavo A. Fernandez, Sunnyvale, CA (US); Xixin Qian, Sunnyvale, CA (US)

(73) Assignee: CSR Technology Inc., Sunnyvale, CA (US)

( * ) Notice: Subject to any disclaimer, the term of this patent is extended or adjusted under 35 U.S.C. 154(b) by 1406 days.

(21) Appl. No.: 12/013,407

(22) Filed: Jan. 11, 2008

(65) Prior Publication Data

US 2009/0179909 A1 Jul. 16, 2009

(51) Int. Cl.
*H04N 5/445* (2011.01)

(52) U.S. Cl. ........... 725/47; 348/173; 715/867; 345/581

(58) Field of Classification Search .................... 725/47, 725/54, 126; 715/867; 348/173, 239; 345/581, 345/334–339, 762–765
See application file for complete search history.

(56) References Cited

U.S. PATENT DOCUMENTS

| | | | | |
|---|---|---|---|---|
| 4,338,623 | A | 7/1982 | Asmus et al. | |
| 5,892,856 | A * | 4/1999 | Cooper et al. | 382/291 |
| 6,313,878 | B1 | 11/2001 | Jankowiak | |
| 6,353,449 | B1 * | 3/2002 | Gregg et al. | 715/762 |
| 6,384,852 | B1 * | 5/2002 | Ye et al. | 715/867 |
| 6,392,695 | B1 | 5/2002 | Watamoto et al. | |
| 6,516,421 | B1 * | 2/2003 | Peters | 713/502 |
| 6,628,247 | B2 * | 9/2003 | Toffolo et al. | 345/31 |
| 6,816,977 | B2 * | 11/2004 | Brakmo et al. | 713/323 |
| 7,120,806 | B1 * | 10/2006 | Codilian et al. | 713/320 |
| 7,139,008 | B2 | 11/2006 | Mori et al. | |
| 7,315,989 | B2 * | 1/2008 | Medvedev et al. | 715/867 |
| 2007/0127569 | A1 | 6/2007 | Hatalkar | |

* cited by examiner

*Primary Examiner* — Annan Shang
(74) *Attorney, Agent, or Firm* — Lando & Anastasi, LLP

(57) ABSTRACT

A method of determining when to activate a screen saver for a display device comprises selecting as a sample set a sparse subset of pixels which collectively form a display frame. An evaluation is performed of only the pixels in the sample set, to determine over a plurality of display frames whether pixels within the sample set have undergone a sufficient amount of change so that burn-in is unlikely. A determination is then made of whether to activate the screen saver based on a result of the evaluation.

33 Claims, 7 Drawing Sheets

SCREEN SAVER TRIGGER USING PARTIAL STILL PICTURE DETECTION

FIELD OF THE INVENTION

At least one embodiment of the present invention pertains to systems that include display devices, such as televisions, video monitors, and the like, and more particularly, to a technique for triggering a screen saver for a display device.

BACKGROUND

Most televisions today are based on display technologies that suffer from a problem known as "burn-in", which is damage to the display from long-persisting static images. The result of burn-in is an undesirable afterimage which can be seen if the set is turned off and/or while a flat color is being displayed. This problem is traditionally addressed in computers by using a "screen saver," which either modifies the screen to use colors or intensities which are less likely to cause burn-in, or changes the display entirely to a display designed to age the screen uniformly so that no burn-in pattern is visible. Such screen savers are typically triggered by inactivity, i.e., a lack of user input from the keyboard or mouse. However, since television is typically a passive experience, it is common for the television controls not to be touched for long periods of time. As such, an inactivity-based screen saver trigger such as used in computers is generally not appropriate for televisions.

There are various known approaches to solving the burn-in problem for televisions. These are continuous approaches where no "screen saver" function is triggered to prevent the burn-in problem. One such approach is "picture rotation," where the entire picture is shifted slightly up, down, left, or right of center over time. This technique would cause any sharp transitions on the screen, where burn-in may be more noticeable, to be blurred. However, it does not eliminate the effects of burn-in.

Another technique is to change the brightness of sidebars to match the average brightness of the screen. This technique avoids a distinctive burn-in pattern between the center of the screen and the sidebars. However, since the sidebars represent a stationary, non-changing pattern that can remain on the screen for thousands of hours during the normal course of watching television programs, burn-in still eventually occurs.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
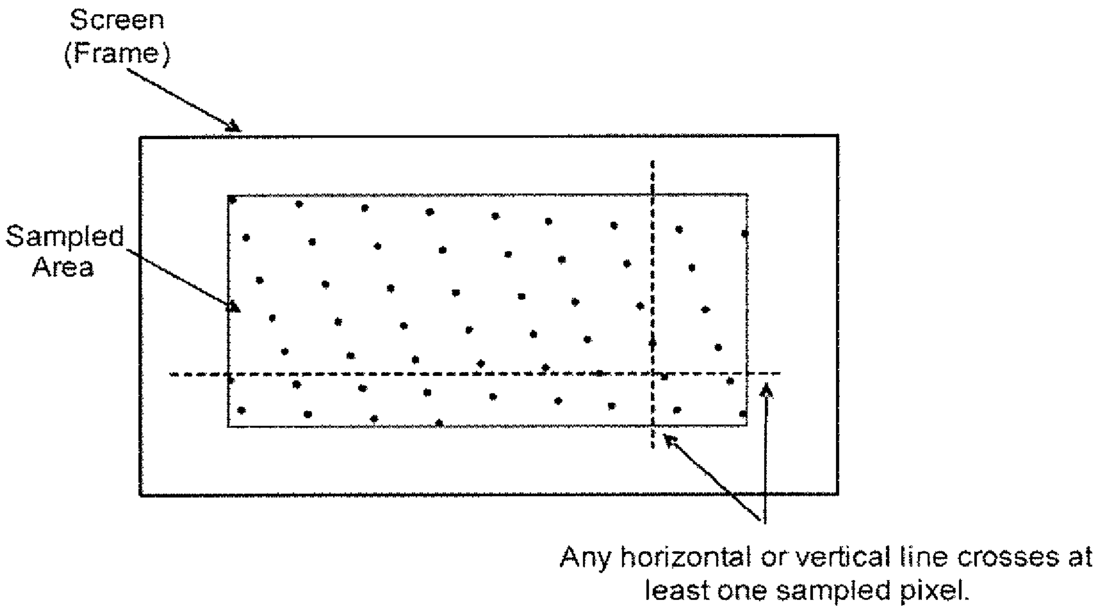
FIG. 1 illustrates a sample pixel pattern that may be used to determine whether to trigger a screen saver.

A technique for determining when to trigger a screen saver, and a display system in which such a technique can be implemented, are described. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment. Further, the embodiments referred to are not necessarily mutually exclusive, unless so stated.

The technique introduced here can be implemented in any system that incorporates or cooperates with a display device that is susceptible to burn-in, such as a television or video monitor. A "television", as the term is used herein, is any system that is capable of receiving, decoding and displaying television signals. A "video monitor", as the term is used herein, is a display device which lacks a tuner.

As described in greater detail below, technique introduced here examines specific pixels of a display image, looking for situations where some of those pixels do not change significantly over a long period of time, even though other adjacent pixels may be changing. If such a situation is detected, a trigger event is generated to indicate the need to invoke a screen saver. If the screen saver has already been triggered, the technique introduced here also provides a method of automatically deactivating it or turning it off, thus restoring normal video display. This approach is specifically designed to handle cases such as DVD menus, which may have animation in the background and fixed text in the foreground. This approach is completely automatic and will be invoked when a fixed pattern is detected anywhere on the screen for a sufficiently long time period.

Thus, in one embodiment the method introduced here includes selecting, as a sample set, a sparse subset of the pixels that collectively form a display frame. A "sparse subset" of a frame is a subset which includes much fewer than all of the pixels that make up a complete display frame, such as, for example, fewer than 10% of all of the pixels in the frame. The term "frame", as used herein, also is intended to refer to a field in systems where two fields make up a frame, such as in interlaced video.

During each frame, an evaluation is performed of only the pixels in the sample set, to determine whether enough pixels within the sample set have undergone enough change, over immediately preceding frames and the current frame, such that that burn-in is unlikely. If a sufficient number of pixels in the sample set are determined not to have changed enough at any given point in time, the screen saver is triggered.

In one embodiment, the method introduced here first takes several samples of each pixel in the sample set and averages them. Then it continuously tests each subsequent pixel against this initial averaged value. If the value has changed, then a state variable for that pixel resets and the process begins over. If the value stays the same for more than some predetermined number of frames, then this pixel is counted toward an "Overtime" count for the entire sample set. If more than some threshold number of pixels in the sample set are "overtime", the screen saver is triggered.

In certain embodiments, the sample set of pixels is defined so that any horizontal or vertical single pixel thick line that completely crosses the analyzed screen area intersects at least one pixel in the sample set. Ways of achieving this objective include, for example, employing a staggered sampled pixel grid, or using a rotated, uniformly sampled pixel grid.

In addition, in certain embodiments, multiple comparison values are employed to determine the presence or absence of screen activity. There are situations in which two or more comparison values are used to provide a more accurate indication of screen activity. In these cases, if the sampled pixel matches any of the compared values within a narrow range, then the pixel is considered not to have changed. Such situations include the accommodation of flashing text, or the handling of set-top boxes which provide poorly implemented "screen savers" which cause a fixed pattern to be displayed in a limited number of screen areas. Such a screen saver approach actually causes screen burn-in those areas.

Referring now to FIG. 1, a subset area of the entire screen (frame) is analyzed, such as the center of the screen. Edges are not analyzed in order to avoid sidebars as well as station logos or "bugs" which may be present in the corners of the transmitted video. The method then takes a sample of the pixels in the analyzed area. Only a small fraction of all of the pixels needs to be sampled. In one embodiment, the analyzed area is centered on the center of the frame and has a width equal to that of the left and right (non-sampled) edges of the frame and has a height equal to that of the top and bottom (non-sampled) edges of the frame, such that the analyzed area has an area of 1/9 (11.1%) that of the entire frame. Further, note that is not necessary that all of the pixels in the analyzed area be sampled. The exact set of pixels to be sampled is not important, however, the sample group should have various desirable properties. Primarily, the sample set should be selected such that any horizontal or vertical single pixel thick line that completely crosses the analyzed area has at least one pixel in the sample set, as shown in FIG. 1. This can be achieved by using a "staggered" or "rotated" grid such as shown in FIG. 1.

Pixels within such a grid can be chosen as follows. Assume the origin point (0,0) of a frame is the top left corner of the frame, with the X coordinate increasing to the right and the Y coordinate increasing downward. Assume further that the screen has width W and height H in pixels, and that the analyzed area is offset AX pixels horizontally and AY pixels vertically from the top-left corner with width AW and height AH, with the following constraints:

$$AX \geqq 0,$$

$$AY \geqq 0,$$

$$AX+AW \leqq W,$$

$$AY+AH \leqq H$$

A horizontal sampling interval SiX and a vertical sampling interval SiY can be chosen to create an array that comprises some number, NUM_PIXELS_TO_SAMPLE, of sampled point coordinates, where NUM_PIXELS_TO_SAMPLE=(AW/SiX)*(AH/SiY). For example, the sampled points at coordinates (SX[i], SY[i]) can be selected according to the following formula, where x varies from 0 to (AW/SiX)−1 and y varies from 0 to (AH/SiY)−1:

$$SX[i]=AX+(((x*SiX)+y) \text{modulo } AW);$$

$$SY[i]=AY+(((y*SiY)+x) \text{modulo } AH);$$

The number of sampled pixels may be as large as the total number of pixels in the analyzed area but could be much smaller and still yield nearly the same performance. For example, the total number of pixels may be as small as, for example, 1% of the total pixels in the analyzed area, perhaps smaller. In the staggered grid example above, in order to fulfill the horizontal and vertical line crossing requirements, the following criteria must be met:

$$SiX \leqq AH/SiY$$

$$SiY < AW/SiX$$

If SiX and SiY are made equal, then the maximum value of SiX and SiY is set to SiX=SiX≦min(SQRT(AW), SQRT(AH)), and the minimum value of NUM_PIXELS_TO_SAMPLE becomes NUM_PIXELS_TO_SAMPLE≧SQRT(AW*AH).

Note that there are other possible arrangements of sampled pixels that may be used. For example, a pattern of concentric circles or even a random sampling of pixels within the analyzed area may yield equivalent or acceptable results. The technique introduced here does not preclude using alternative arrangements of sampled pixels. However, the set of sampled pixels, and hence their pattern, should be fixed before any sampling takes place.

As an aid in improving performance, the device addresses of the pixels to be sampled can be cached. At its simplest, this address may be computed as BaseAddress+SY[i]*W+SX[i] although it could involve a much more complex hardware-specific address translation function. This cache may be made relative to the beginning of a frame buffer so that the addresses of different frame buffers with the same dimensions, which are typically used during video processing, can be easily calculated using the same cache.

In certain embodiments, a separate state machine is implemented for each pixel in the sample set, and each state machine can determine state over multiple frames for its pixel. The state machines for the entire sample set collectively determine the value of a variable, Overtime, for each frame. The variable Overtime is generally indicative of the number of pixels in the sample set that have remained relatively unchanged for a significant period of time (in terms of burn-in potential), as measured during the current frame. The variable Overtime applies to the entire sample set and is evaluated during each frame to determine whether to trigger the screen saver. In particular, during each frame, Overtime is compared to a threshold value, OvertimeThresh; if Overtime exceeds OvertimeThresh, the screen saver is triggered, otherwise, the screen saver is not triggered. OvertimeThresh is selected in advance based upon N (the sample size) and the burn-in potential for the particular type of display device being used.

Figure 2:
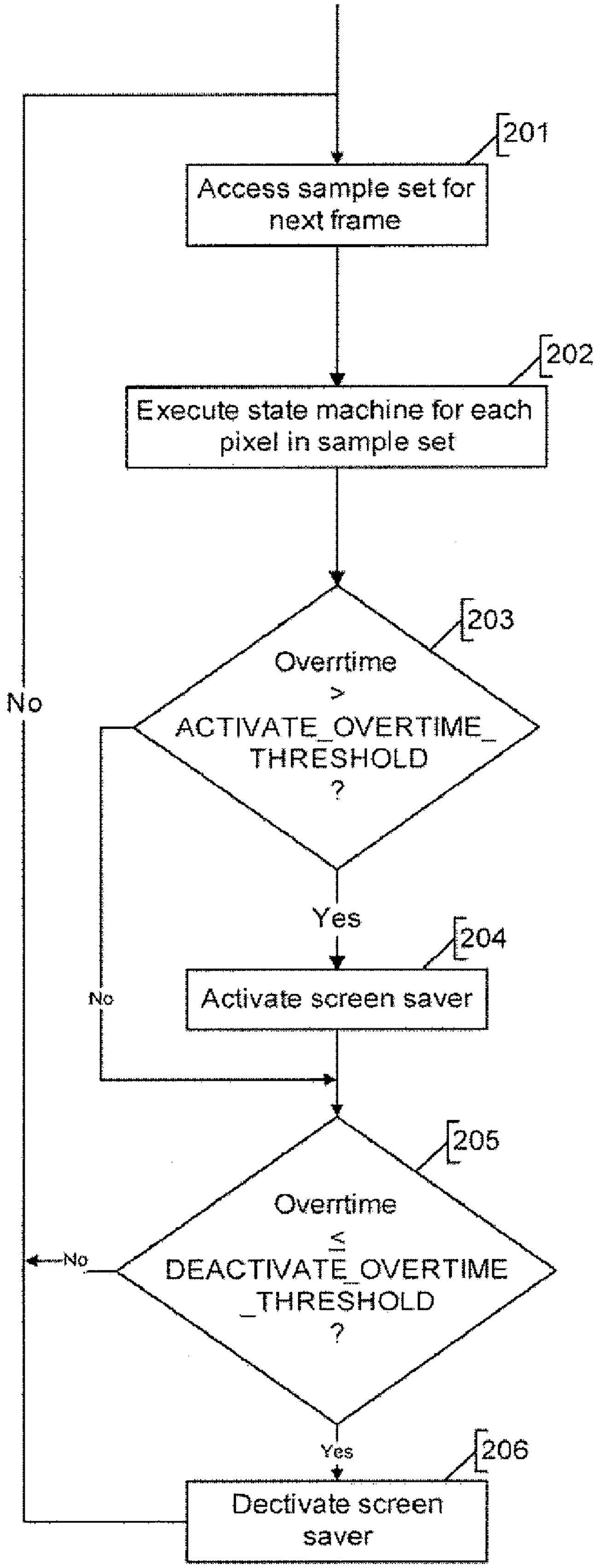
FIG. 2 is a flow diagram illustrating an overall process performed for each frame, to determine whether to activate or deactivate a screen saver.

FIG. 2 shows the overall process that can be performed for each frame, to determine whether to trigger a screen saver, in accordance with the technique introduced here. Initially, the sample set of pixels for the current frame is accessed at 201. At 202 the state machine for each pixel in the sample set is executed (in parallel or sequentially) for the current frame. A determination is then made at 203 of whether Overtime exceeds the threshold ACTIVATE_OVERTIME-THRESHOLD; if so, the screen saver is triggered at 204; otherwise, the process bypasses 204 and proceeds to 205. At 205 a determination is made of whether Overtime is less then or equal to the threshold DEACTIVATE_OVERTIME-THRESHOLD; if so, the screen saver is deactivated at 206; otherwise the process loops back to 201 for processing of the next frame. Note that Overtime is reset to zero at the beginning of processing each frame.

Figure 3:
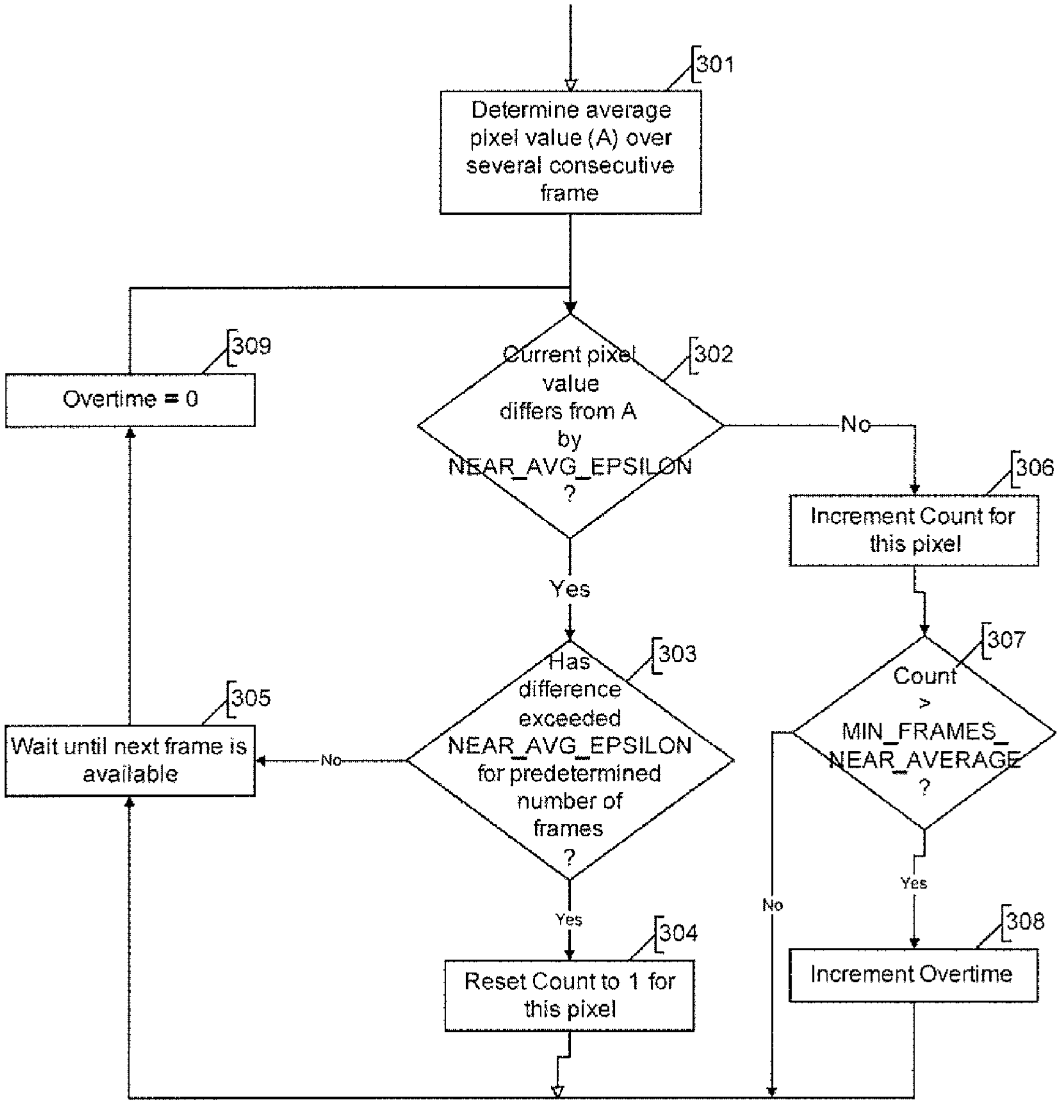
FIG. 3 is a flow diagram illustrating a process performed over multiple frames for each pixel in a sample set.

FIG. 3 shows a process that can be performed (at least partially by the state machine) for each pixel in the sample set, over multiple frames, according to the technique introduced here. Initially, at 301 the state machine averages the value of the pixel over several frames. In one embodiment, this "value" is the luminance ("Luma") value of the pixel, however, in other embodiments one or more of the chrominance (color) values of the pixel could be used instead, or a combination of the luminance and/or one or more of the chrominance values could be used. In one embodiment, the value of the pixel is averaged over four frames, although a different number of frames could instead be used. Also, a different filter besides a simple average could be used instead, such as a weighted filter or a median.

At 302 the state machine determines whether the value of the pixel in the current frame differs from the average for that pixel by some predetermined difference value, NEAR_AVG_EPSILON. If it does, the process proceeds to 303, in which the state machine determines whether the difference between the current pixel value and the average has exceeded NEAR_AVG_EPSILON for a predetermined number of consecutive frames. This predetermined number of frames depend upon the burn-in potential for the particular type of display device being used; in one example, this is 12 frames. If the outcome of 303 is affirmative, this means the pixel is changing, so at 304 the state machine resets a counter variable, Count, for this pixel to one (1). The variable Count represents the number of frames for which the pixel has remained relatively unchanged. The state machine then waits until the next frame (305) for further processing. At the start of the next frame, Overtime is reset to zero at 309 (note, however, that there is one Overtime value per frame, it is not a per-pixel variable) and the state machine loops back to 302, described above. If the outcome of 303 is negative, then the state machine bypasses 304 and proceeds directly to 305, where it waits until the next frame.

Referring again to 302, if the state machine determines that the current value of the pixel does not differ from the average by at least NEAR_AVG_EPSILON, then the state machine proceeds to 306, where it increments Count for the pixel. The state machine then determines at 307 whether Count for the pixel exceeds a threshold count value, Mintime. Mintime is in units of frames and is chosen in advance based upon the burn-in potential for the particular type of display device being used. In one embodiment, Mintime is chosen to be 36,000 frames (which, at a typical frame rate of 60 Hz, corresponds to 10 minutes). If Count exceeds Mintime, then at 308 the state machine increments Overtime (note that Overtime is affected by all pixels in the sample set). The process then proceeds to 305, described above. If Count does not exceed Mintime at 307, then the process proceeds immediately from 307 to 305, described above.

Thus, in one embodiment the process introduced here first takes four samples of each pixel and averages them. Then the process continuously tests each subsequent pixel against this initial averaged value. If the value changes, then a state variable for that pixel resets and the process begins over. If the value stays the same for more than Mintime frames, then this pixel is counted toward the Overtime count. If more than OvertimeThresh pixels are "overtime", the screen saver is triggered.

Figure 4:
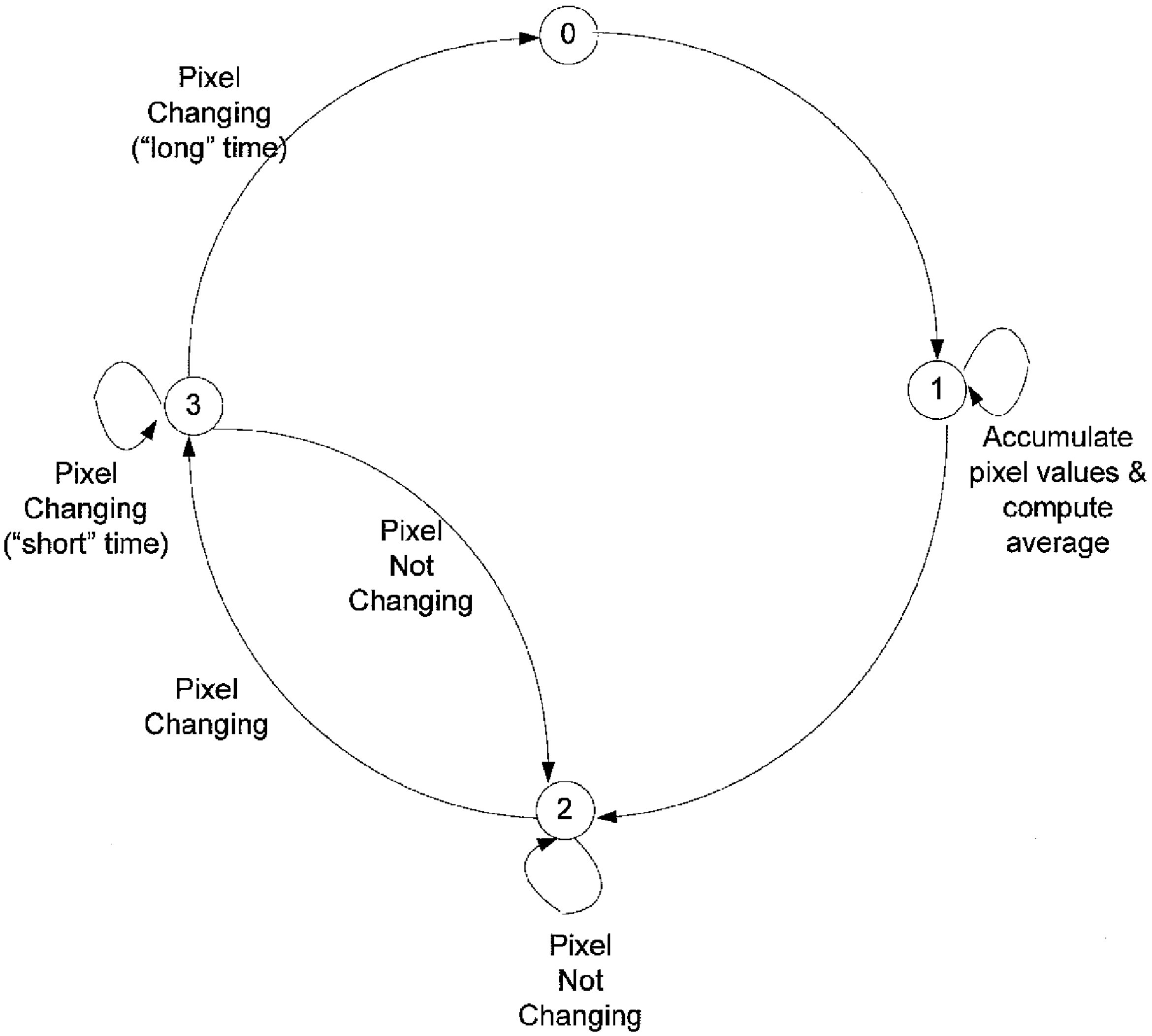
FIG. 4 illustrates a state machine executed over multiple frames for each pixel in the sample set.

FIG. 4 illustrates an example of the state machine that can be executed for a given pixel in the sample set. In the illustrated embodiment, the state machine includes the following states: state 0, state 1, state 2 and state 3. Note that this is just one example of how the state machine for a pixel can be implemented; any of various other implementations could instead be used.

The pixel is initialized to state 0. The state of the pixel is then adjusted according to an algorithm, which is described in greater detail below. State 1 adds up the values of the pixel for some number (e.g., four) of consecutive frames. State 1 then computes the average value of the pixel for those four frames. As noted above, the use of four frames to compute the average is an example of how this process may be implemented.

State 2 compares the difference between the current value of the pixel and the average for the pixel against the difference value, NEAR_AVG_EPSILON, as described above (302), to determine whether the pixel has changed significantly from the average (where "significantly" depends on NEAR_AVG_EPSILON). If the pixel has not changed significantly (306), then Count for the pixel is incremented. Further, if Count for the pixel exceeds a value, MIN_FRAMES_NEAR AVG (307), then Overtime (which applies to the entire sample set) is also incremented.

Once a pixel is in state 2, it can remain in state 2 indefinitely for any number of frames, which will occur if the pixel does not change significantly from frame to frame. On the other hand, if the pixel does change significantly, then the pixel will proceed from state 2 to state 3.

In state 3, essentially the same comparison is made as in state 2, as just described, to determine whether the pixel has changed significantly. When in state 3, if the pixel has not changed significantly (306), then the state of the pixel goes back to state 2. However, if the pixel was determined to have changed significantly, then its state may be reset to state 0 or remain in state 3, depending on the number (NumDiff) of consecutive frames for which the pixel has deviated significantly from the average value. Specifically, if the pixel has changed significantly for only a "short" time (i.e., for less than MAX_FRAMES_NOT_NEAR_AVG frames), the pixel remain in state 3. If the pixel has changed significantly for a "long" time (i.e., more than MAX_FRAMES_NOT_NEAR_AVG frames), the state of the pixel will be reset to state 0.

Figure 5A:
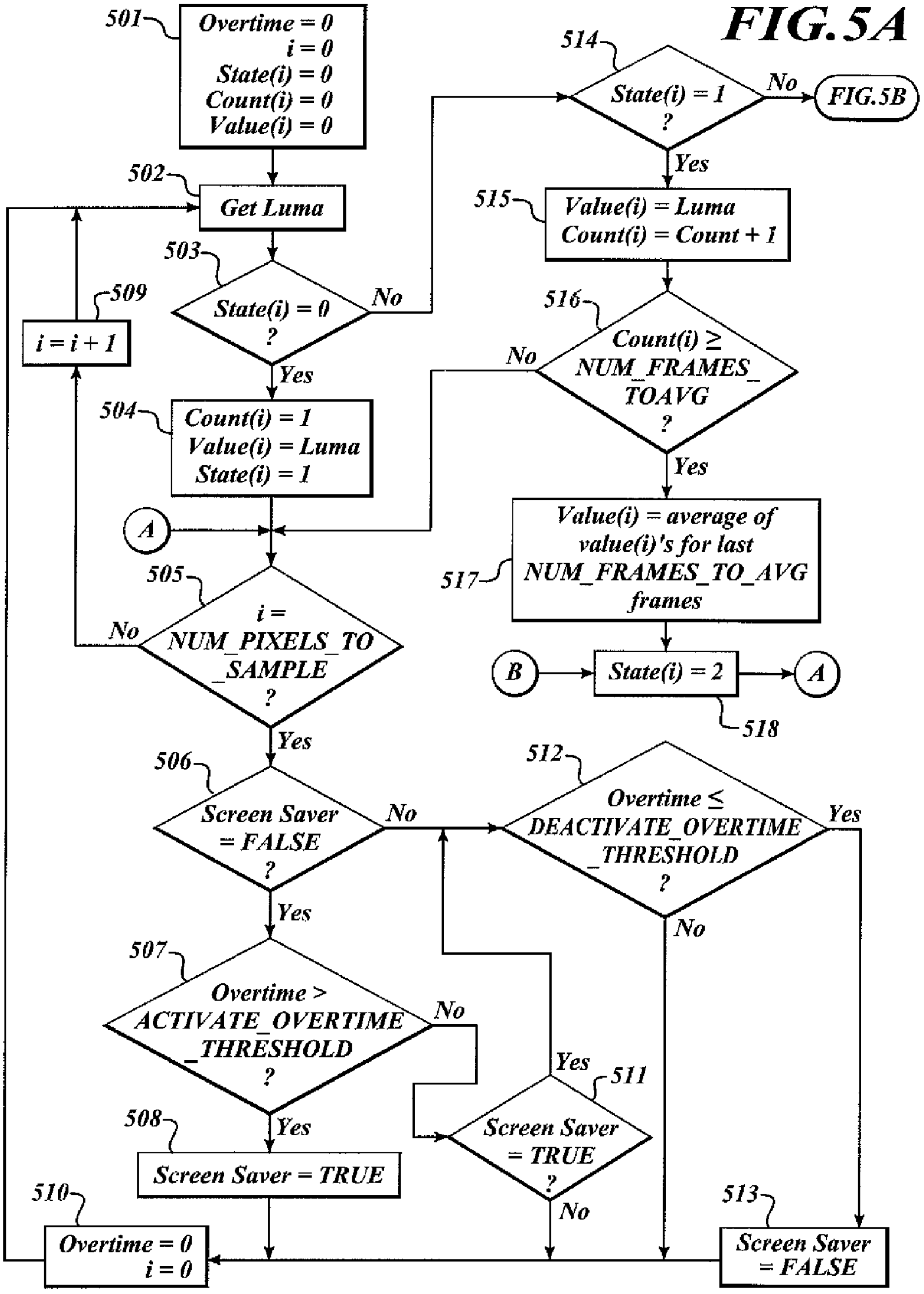
FIGS. 5A and 5B are flow diagrams illustrating a detailed process performed on a frame by frame basis to determine whether to trigger a screen saver, according to an embodiment of the invention.
Figure 5B:
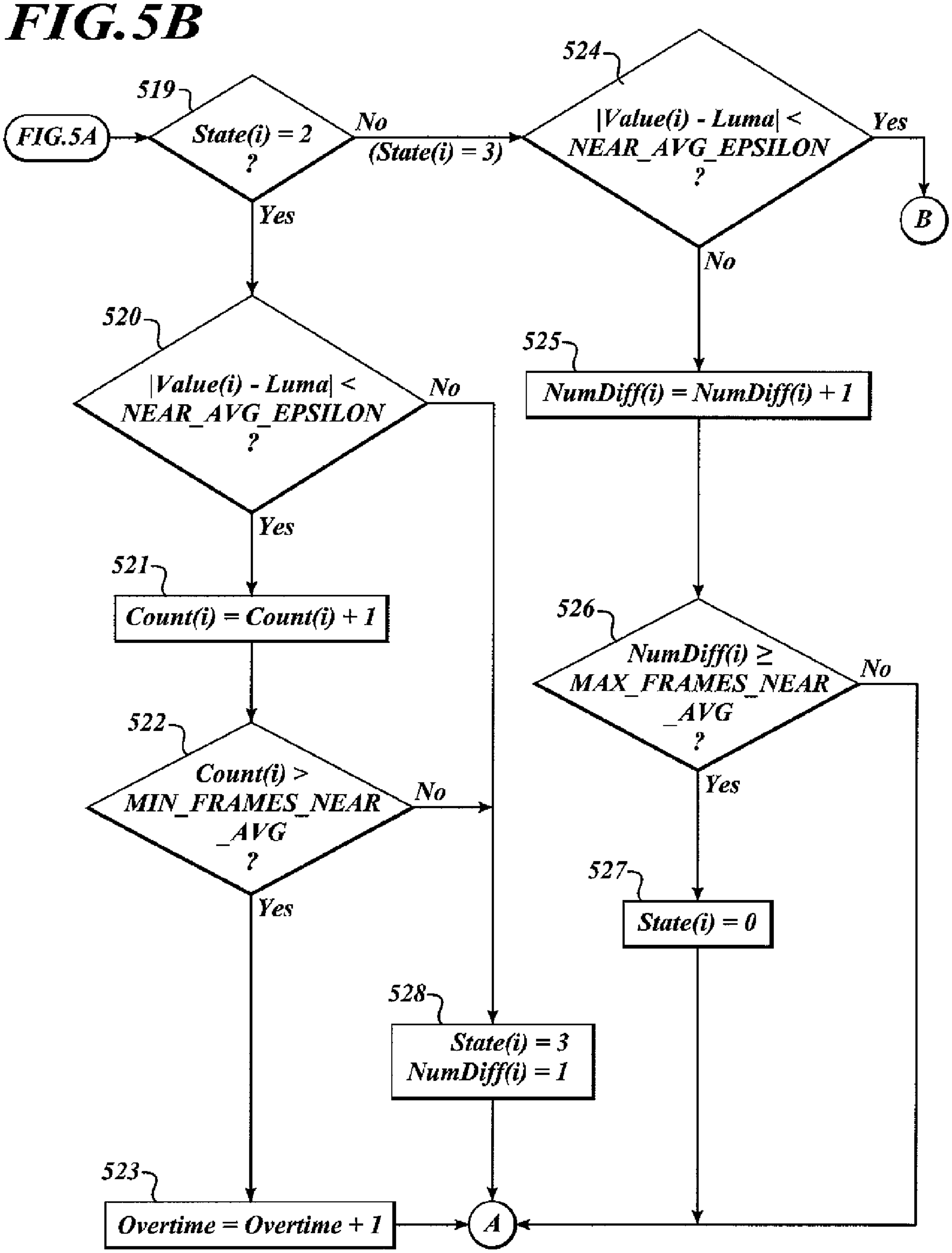

FIGS. 5A and 5B illustrate the details of a process that can be performed on a frame by frame basis, to determine whether to trigger a screen saver, using the state machine described above. Initially, several variables are initialized to zero at 501: Overtime, i (an index variable), State(i), Count(i) and Value (i). The variables State(i), Count(i) and Value(i) are arrays of size NUM_PIXELS_TO_SAMPLE (the number of pixels in the sample set). State(i) is a value which remembers the internal state for each pixel. Count(i) is the number of frames that a given pixel has held nearly the same value. Value(i) is the luminance (brightness) value of a given pixel (for this example, the chrominance of a pixel is ignored). For each video frame (e.g., 30 or 60 Hz), the triggering determination process then does the following.

At 502, Luma, the luminance value for pixel i for the current frame, is retrieved (e.g., from cache memory). A set of operations is then performed which depend on the current state of the pixel.

If the state of the pixel, State(i), is 0 (503), then at 504, Count(i) is set equal to 1, Value(i) is set equal to Luma, and the state of the pixel, State(i), is set equal to 1.

After 504, the process proceeds to 505, where the index variable i is compared to the value NUM_PIXELS_TO_SAMPLE. If the index variable i equals NUM_PIXELS_TO_SAMPLE (which means that this process has processed the entire sample set of pixels for the current frame), then the process proceeds to 506. Otherwise, the process increments I at 509 and loops back to 502.

If the variable Screen Saver is FALSE at 506 (meaning the screen saver is off) and Overtime exceeds a first threshold, ACTIVATE_OVERTIME_THRESHOLD, at 507, then the process triggers the screen saver at 508 by setting the variable Screen Saver to TRUE. If Screen Saver is found to be FALSE at 506 but Overtime is found to be less than or equal to ACTIVATE_OVERTIME_THRESHOLD at 507, the process then branches to 511.

At 511, if the screen saver is already on (i.e., Screen Saver is TRUE), then at 512 Overtime is compared to a second threshold, DEACTIVATE_OVERTIME_THRESHOLD. If Overtime is less than or equal to DEACTIVATE_OVERTIME_THRESHOLD at 512, the screensaver is deactivated by setting Screen Saver to FALSE at 513.

After activating or deactivating the screen saver at 508 or 513, respectively, or after a negative outcome of decision 511 or decision 512, the variable Overtime and the index variable i are both reset to zero at 510, and the process then branches back to 502 to process the first pixel in the sample set for the next frame.

Referring back to 502, after getting the pixel value Luma, if State(i) is equal to 1 (i.e., the pixel is in State 1) (514), then at 515 Value(i) is incremented by Luma (the current value of the current pixel) and Count(i) is incremented by one. Next, at 516 the process determines whether Count(i) is greater than or equal to the (tunable) value, NUM_FRAMES_TO_AVG, which is the number of frames over which each sample pixel is averaged. If Count(i) is greater than or equal to NUM_FRAMES_TO_AVG, then Value(i) is set equal to the average of the Value(i)'s for the last NUM_FRAMES_TO_AVG frames (including the current frame). State(i) is then set equal to 2, in the process then branches back to 505, described above. If Count(i) is less than NUM_FRAMES_TO_AVG at 516, then from 516 the process branches directly back to 505.

Referring again back to 502, after getting the pixel value Luma, if State(i) is equal to 2 (i.e., the pixel is in State 2) (519), then at 520 the process compares the magnitude of (Value(i)−Luma) to NEAR_AVG_EPSILON. If the magnitude of (Value(i)−Luma) is less than NEAR_AVG_EPSILON, then at 521 Count(i) is incremented by one. After 521, the process determines whether Count(i) is greater than the value MIN_FRAMES_NEAR_AVERAGE at 522. If Count (i) is greater than that value, then Overtime is incremented by one at 512, and the process then branches back to 505 as described above. Otherwise, at 528 the process sets State(i) equal to 3 and sets a counter variable NumDiff(i) equal to 1, and then branches back to 505. Likewise, if the magnitude of (Value(i)−Luma) is greater than or equal to NEAR_AVG_EPSILON, then from 520 the process sets State(i) equal to 3 and sets NumDiff(i) equal to 1 at 528, and then branches back to 505.

Referring again back to 502, after getting the pixel value Luma, if State(i) is not 0, 1 or 2, then State(i) must be equal to 3 (i.e., the pixel is in State 3). In that case, at 524 the process compares the magnitude of (Value(i)−Luma) to NEAR_AVG_EPSILON. If the magnitude of (Value(i)−Luma) is less than NEAR_AVG_EPSILON, then the process branches to 518, where State(i) is set equal to 2 as described above. If the magnitude of (Value(i)−Luma) is greater than or equal to NEAR_AVG_EPSILON at 524, then NumDiff(i) is incremented by one at 525, and the process next compares NumDiff(i) to a value, MAX_FRAMES_NOT_NEAR_AVG, at 526. If NumDiff(i) is greater than or equal to MAX_FRAMES_NOT_NEAR_AVG at 526, then the process resets State(i) equal to 0 at 527, and the process then branches to 505, described above. If NumDiff(i) is less than MAX_FRAMES_NOT_NEAR_AVG at 526, the process branches directly from 525 to 505.

Suggested initial values for variables mentioned above are as follows, although it should be noted that these values are only examples can change from one embodiment to another:

NUM__PIXELS__TO__SAMPLE: (depends on performance)
NUM__FRAMES__TO__AVERAGE: 4
NEAR__AVERAGE__EPSILON: +/−3
MIN__FRAMES__NEAR__AVERAGE: 10 minutes * 60 sec * 60 Hz = 36,000
MAX__FRAMES__NOT__NEAR__AVERAGE: 200 ms * 60 frames/sec = 12 frames
ACTIVATE__OVERTIME__THRESHHOLD: (depends on NUM__PIXELS__TO__SAMPLE; can be as small as 1)
DEACTIVATE__OVERTIME__THRESHHOLD: (depends on NUM__PIXELS__TO__SAMPLE; must be ≦ ACTIVATE__OVERTIME__THRESHHOLD)

Numerous variations upon the above described processes are possible while still implementing the essence of the technique introduced here. For example, the analyzed area of the frame can be varied. In the above description, a simple rectangular subset of the screen is used. However, other shapes may also work. For example, a rectangle with one or more corners cut out may be appropriate for avoiding station logos ("bugs").

Further, the spatial sample frequency of pixels can be varied. In the above description, a uniform grid of pixels is used. However, it may be reasonable to sample more pixels closer to the center of the screen than the edges, or vice versa. It is also possible to rearrange pixels to be more or less sensitive to specific patterns found in actual broadcast video, such as the logo of a specific television channel or program.

Further, chrominance can be used in addition to, or instead of, luminance. The description above focuses on only the luminance (brightness) and ignores the chrominance (color) component of all sampled pixels. Color (with or without brightness) could also be used for comparison.

The example described above also samples each pixel four times and uses the average of these first four samples as the comparison for all subsequent samples. However, the number of samples in such an average can be varied from as few as one to any arbitrarily large number of samples (and as noted above, a filter other than an average could be used instead). Note, however, that once initial samples are taken, the comparison should be fixed against these initial samples and not varied. This prevents a scene which changes very gradually over time from triggering the screen saver.

Multiple comparison values can also be employed. The description above uses only one (averaged) value with which to compare pixel values. However, there are situations where two or more comparison values may be appropriate. In such a case, if the sampled pixel matches any of the compared values, then it is considered not to have changed. Such situations include the accommodation of flashing text, or the handling of set-top boxes which include so-called "screen savers" that are implemented very poorly, because a fixed pattern is displayed in only a limited number of places on the screen, thus actually causing screen burn-in those areas.

Further, the description above treats all sampled pixels in the same way regardless of the sampled value. It may be appropriate, however, to only count pixels which are brighter than specific thresholds, assuming that darker pixels are not likely to cause burn-in even if displayed for a long time.

The above description also does not take into account the spatial relationships between pixels. Screen burn-in is most apparent when bright pixels have been displayed next to dark pixels for a long time. With this in mind, the sample set may be modified to only be sensitive to sharp transitions in color between adjacent pixels. This is typical of text over video, where light colored text is typically surrounded by a dark outline, so that it will be visible over arbitrary video displays.

Moreover, variations in various thresholds and timings can be employed. Numeric parameters in the algorithm can be tuned to be more or less sensitive to real situations that have been observed in the field.

Figure 6:
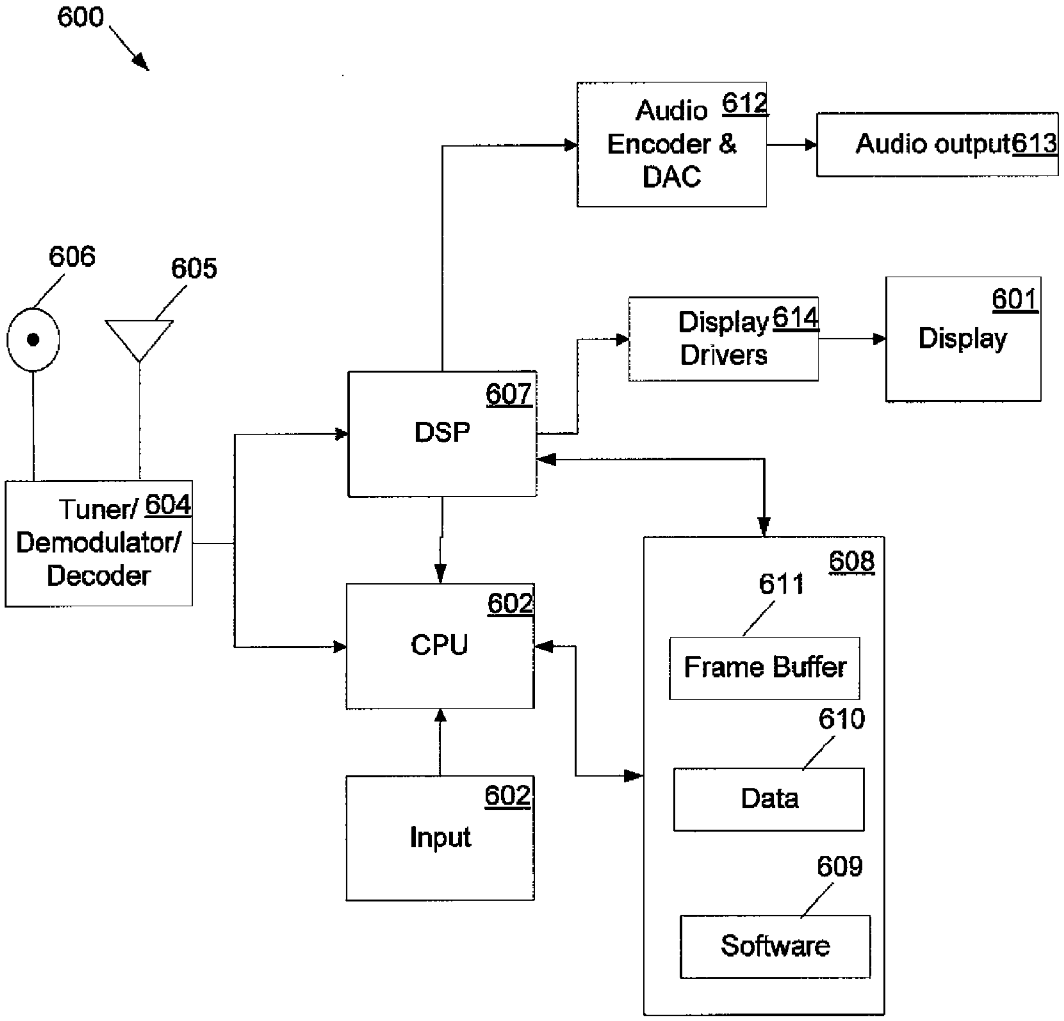
FIG. 6 illustrates a system in which the described screen saver triggering technique can be implemented.

The technique described above can be implemented in any system that incorporates or cooperates with a display device that is susceptible to burn-in, such as a television or video monitor. Note that this technique can also be used for a set-top box or other video device such as a VCR, DVD player, or video game which feeds video to a television or video monitor. FIG. 6 illustrates an example of a television system 600 in which the described screen saver triggering technique can be implemented. The system 600 includes a display device 601 which is to be protected by a screensaver. The system 600 further includes a central processing unit (CPU) 602 which controls the overall operation of the system 600. An input device 603, such as a remote control unit and/or controls on the television, provide signals representing user inputs to the CPU 602. The CPU 602 is coupled to a television tuner/demodulator/decoder unit 604, which receives an input television signal from an antenna 605 or cable 606. The output of the tuner/demodulator/decoder unit 604 is provided to a digital signal processor (DSP) 607 and to the CPU 602. The DSP 607 operates in response to control signals from the CPU 602. Coupled to the DSP 607 and the CPU 602 is a memory 608, in which is stored software 609 and data 610, as well as a frame buffer 611 for the display device 601. Both the screensaver and the above-described technique for triggering it may be implemented in the form of software and/or data stored in the memory 608. The memory 608 may be any conventional form of storage medium, and it may be volatile or nonvolatile, such as any form of random access memory (RAM), read-only memory (ROM), flash memory, disk, tape, etc. Accordingly, the term "software" as used herein can include "firmware".

The DSP 607 provides output representing audio data to an audio encoder and digital-to-analog converter 612, which provides audio output signals to one or more audio output devices (e.g., speakers, headphones, etc.) 613. The DSP 607 also provides output representing video data to one or more display drivers 614, which provide a video output signal to the display device 601.

Thus, a technique for determining when to trigger a screen saver, and a display system in which such a technique can be implemented, have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that stores information in a form accessible by a machine (e.g., a microprocessor). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of triggering a screen saver, the method being implemented in a system having a display, the method comprising:

outputting a current frame of a video on the display;

selecting a sparse subset of pixels from a total number of pixels of the display;

determining a plurality of pixel values for each pixel in the sparse subset, each respective pixel value of the plurality of pixel values being determined based on a respective previous frame previously output on the display;

evaluating only the pixels in the sparse subset, by independently evaluating each respective pixel in the sparse subset using the plurality of pixel values for the respective pixel and a current value of the respective pixel in the current frame to determine whether the respective pixel has undergone a threshold amount of change in value over a plurality of frames; and triggering the screen saver to modify the video being output on the display in response to determining that a plurality of pixels in the sparse subset have not undergone the threshold amount of change in value over the plurality of frames.

2. A method as recited in claim 1, further comprising:

selecting an area of the display to be analyzed, the area being less than the entire display;

wherein selecting the sparse subset of pixels includes selecting the sparse subset from only pixels in the area to be analyzed.

3. A method as recited in claim 1, wherein selecting a sparse subset includes selecting a sparse subset such that any horizontal or vertical single pixel thick line that completely crosses the sparse subset intersects at least one pixel in the sparse subset.

4. A method as recited in claim 1, wherein the sparse subset includes less than 1% of the total number of pixels of the display.

5. The method as recited in claim 1, wherein the sparse subset includes no more than 10% of the total number of pixels of the display.

6. A method of determining whether to activate a screen saver for a display device, the method comprising:

selecting a sparse subset of pixels from a total number of pixels outputting a frame on the display device, the sparse subset being no more than 10% of the total number of pixels;

performing an evaluation of only the pixels in the sparse subset, including independently evaluating each pixel in the sparse subset over a plurality of frames; and determining whether to activate the screen saver based on a result of the evaluation.

7. A method as recited in claim 6, further comprising:

selecting an area of the frame being output on the display device, the area being less than the entire frame;

wherein selecting the sparse subset of pixels includes selecting the sparse subset from only pixels in the area.

8. A method as recited in claim 6, wherein performing an evaluation further includes determining over the plurality of frames whether pixels within the sparse subset have undergone a threshold amount of change.

9. A method as recited in claim 8, wherein determining over the plurality of frames whether pixels within the sparse subset have undergone a threshold amount of change further includes, for each pixel in the sparse subset, in each of the plurality of frames, the plurality of frames being consecutive frames:

determining whether a current value of the pixel deviates from a precomputed value of the pixel by at least a predetermined amount, and when the current value of the pixel does not deviate from the precomputed value by at least the predetermined amount, then incrementing a counter for said pixel; and wherein determining over the plurality of frames whether pixels within the sparse subset have undergone a threshold amount of change further includes determining for the frame being output on the display device whether enough pixels within the sparse subset have undergone less than a maximum threshold amount of change based on the counters of the pixels in the sparse subset.

10. A method as recited in claim 9, wherein the counter is incremented for a pixel only if the current value of the pixel exceeds a predetermined brightness threshold.

11. A method as recited in claim 9, wherein the counter is incremented for a pixel only if the current value of the pixel differs from a current value of a neighboring pixel by at least a predetermined amount.

12. A method as recited in claim 9, wherein for each pixel, the precomputed value of the pixel is an average of a plurality of values of the pixel over a predetermined number of frames.

13. A method as recited in claim 8, wherein determining over the plurality of frames whether pixels within the sparse subset have undergone a threshold amount of change further includes, in each of the plurality of frames, the plurality of frames being consecutive frames:

comparing a current value of a pixel to a plurality of different predetermined values, and determining whether to increment a counter for the pixel based on whether the current value of the pixel deviates from any of the plurality of different values by at most a predetermined amount; and wherein determining over the plurality of frames whether pixels within the sparse subset have undergone a threshold amount of change further includes determining for the frame being output on the display device whether pixels within the sparse subset have undergone the threshold amount of change based on current values of counters of the pixels in the sparse subset, the current values of counters corresponding to the frame being output on the display device.

14. A method as recited in claim 8, wherein performing the evaluation further includes executing a separate independent state machine for each of the pixels in the sparse subset.

15. A method as recited in claim 6, wherein the sparse subset is defined such that any horizontal or vertical single pixel thick line that completely crosses the sparse subset intersects at least one pixel in the sparse subset.

16. A method as recited in claim 6, wherein the screen saver is characterized by a predetermined value being assigned to each of the pixels of the display device, for each of a plurality of frames.

17. A method as recited in claim 6, wherein a total number of pixels in the sparse subset is less than 1% of the total number of pixels of the display device.

18. A method as recited in claim 6, wherein performing an evaluation further includes determining whether more than a threshold number of pixels within the sparse subset have undergone less than a threshold amount of change over the plurality of frames; and wherein determining whether to activate the screen saver based on a result of the evaluation includes determining to activate the screen saver if more than the threshold number of pixels within the sparse subset have undergone less than the threshold amount of change over the plurality of frames.

19. A method of activating a screen saver for a device having a display, the method comprising:

outputting a frame on the display;

selecting an area of the display;

selecting a sparse subset of pixels from the area; and for each of a plurality of consecutive frames output on the display:

determining a count for each of the pixels in the sparse subset, wherein determining the count includes incrementing the count if a difference between a current value of the pixel and a precomputed value corresponding to the pixel is less than a predetermined amount, and activating the screen saver to modify the display in response to determining that each of the counts for a plurality of pixels in the sparse subset exceed a predetermined count threshold.

20. A method as recited in claim 19, wherein activating the screen saver in response to determining that each of the counts for a plurality of pixels in the sparse subset exceed a predetermined count threshold further includes:

incrementing an overtime count for the frame being output on the display in response to the count of a pixel in the sparse subset exceeding the predetermined count threshold;

comparing the overtime count to an overtime activation threshold; and activating the screen saver in response to the overtime count exceeding the overtime activation threshold.

21. A method as recited in claim 19, wherein the count is incremented for a pixel only if the current value of the pixel exceeds a predetermined brightness threshold.

22. A method as recited in claim 19, wherein the count is incremented for a pixel only if the current value of the pixel differs from a current value of a neighboring pixel by at least a predetermined amount.

23. A method as recited in claim 19, wherein determining a count for each of the pixels in the sparse subset further includes:

resetting the count for a pixel if a value of the pixel has deviated from the precomputed value corresponding to the pixel by at least the predetermined amount, for at least a predetermined number of consecutive frames.

24. A method as recited in claim 19, wherein the sparse subset is defined such that any horizontal or vertical single pixel thick line that completely crosses the area intersects at least one pixel in the sparse subset.

25. A method as recited in claim 19, wherein a total number of pixels in the sparse subset is less than 5% of a total number of pixels in the area, and wherein the total number of pixels in the area is less than 10% of a total number of pixels of the display.

26. A system comprising:

a processor;

a display device including a plurality of pixels;

a frame buffer to store display frames of video data, each display frame representing an image for display on the display device based on the video data; and a memory storing instructions which, when executed by the processor, cause the processor to perform a screen saver triggering process that includes:

selecting a sparse subset of pixels from the plurality of pixels of the display device, the sparse subset being no more than 10% of the plurality of pixels that form a display frame;

determining over a plurality of display frames whether pixels within the sparse subset have undergone a threshold amount of change, including independently evaluating each pixel in the sparse subset; and determining whether to trigger a screen saver for the display device based on whether pixels within the sparse subset have undergone the threshold amount of change.

27. A system as recited in claim 26, wherein determining over a plurality of display frames whether pixels within the sparse subset have undergone a threshold amount of change further includes, for each pixel in the sparse subset, in each of a plurality of consecutive display frames;

determining whether a current value of the pixel deviates from a precomputed value of the pixel by at most a predetermined amount, and when the current value of the pixel does not deviates from the precomputed value by at most the predetermined amount, then incrementing a counter for said pixel; and wherein determining over a plurality of display frames whether pixels within the sparse subset have undergone a threshold amount of change further includes determining for a display frame whether pixels within the sparse subset have undergone the threshold amount of change based on values of the counters in the display frame.

28. A system as recited in claim 27, wherein the counter is incremented for a pixel only if the current value of the pixel exceeds a predetermined brightness threshold.

29. A system as recited in claim 27, wherein the counter is incremented for a pixel only if the current value of the pixel differs from a current value of a neighboring pixel by at least a predetermined amount.

30. A system as recited in claim 26, wherein determining over the plurality of display frames whether pixels within the sparse subset have undergone a threshold amount of change further includes, in each of a plurality of consecutive display frames;

comparing a current value of a pixel to a plurality of different predetermined values, and incrementing a counter for the pixel based on determining whether the current value of the pixel deviates from any of the plurality of different values by at most a predetermined amount; and wherein determining over the plurality of display frames whether pixels within the sparse subset have undergone a threshold amount of change further includes determining for a display frame whether pixels within the sparse subset have undergone the threshold amount of change based on counters of the pixels in the sparse subset.

31. A system as recited in claim 26, wherein determining over a plurality of display frames whether pixels within the sparse subset have undergone a threshold amount of change comprises executing a separate independent state machine for each of the pixels in the sparse subset in each of the plurality of display frames.

32. A system as recited in claim 26, wherein the sparse subset is defined such that any horizontal or vertical single pixel thick line that completely crosses the sparse subset of pixels intersects at least one pixel in the sparse subset.

33. A system as recited in claim 26, wherein the screen saver is characterized by a predetermined value being assigned to each of the pixels of the display device for each of a plurality of display frames.

* * * * *